US009811936B2

(12) United States Patent
McNerney et al.

(10) Patent No.: US 9,811,936 B2
(45) Date of Patent: Nov. 7, 2017

(54) LEVEL-BASED DATA SHARING FOR DIGITAL CONTENT PRODUCTION

(71) Applicant: DreamWorks Animation LLC, Glendale, CA (US)

(72) Inventors: Peter McNerney, Glendale, CA (US); Evan P. Smyth, Glendale, CA (US); Robert Giles Wilson, Burbank, CA (US); Greg Heflin, Glendale, CA (US); Jeff Beall, Glendale, CA (US); Jonathan Gibbs, Belmont, CA (US); Mike Hamler, Glendale, CA (US); Benoit Gagnon, Glendale, CA (US)

(73) Assignee: DREAMWORKS ANIMATION L.L.C., Glendale, CA (US)

( * ) Notice: Subject to any disclaimer, the term of this patent is extended or adjusted under 35 U.S.C. 154(b) by 0 days.

(21) Appl. No.: 13/843,695

(22) Filed: Mar. 15, 2013

(65) Prior Publication Data
US 2014/0267237 A1    Sep. 18, 2014

(51) Int. Cl.
*G06T 13/40* (2011.01)
*G06T 17/00* (2006.01)
(Continued)

(52) U.S. Cl.
CPC .............. *G06T 13/40* (2013.01); *G06T 13/20* (2013.01); *G06T 15/00* (2013.01); *G06T 17/00* (2013.01); *G06T 19/00* (2013.01); *G06T 2210/61* (2013.01)

(58) Field of Classification Search
CPC .......... G06T 17/00; G06T 17/20; G06T 19/00
(Continued)

(56) References Cited

U.S. PATENT DOCUMENTS

| 4,922,413 A | 5/1990 | Stoughton et al. |
| 5,307,295 A | 4/1994 | Taylor et al. |

(Continued)

FOREIGN PATENT DOCUMENTS

| CN | 101916324 A | 12/2010 |
| CN | 102053989 A | 5/2011 |

(Continued)

OTHER PUBLICATIONS

Kim Barrett, et. al. "A Monotonic Superclass Linearization for Dylan", 1996, ACM 0-89791-788-X/96/0010 OOPSLA '96 CA, USA, pp. 69-82.*

(Continued)

*Primary Examiner* — Devona Faulk
*Assistant Examiner* — Hai Tao Sun
(74) *Attorney, Agent, or Firm* — Dentons US LLP

(57) ABSTRACT

Systems and methods for rendering three-dimensional images using a level graph are provided. The level graph is accessed, comprising a first node, a second node, and a target node. The second and target nodes are descendants of the first node. The first node comprises first scene description data, the second node comprises first variation data, and the target node comprises second variation data. The target node is selected for computation. Target node ancestors are determined. The first node and the second node are ancestors of the target node. A linearization of the ancestors is determined, comprising an order. A scene description is initialized using the first scene description data. The first variation is applied to the scene description, based on the linearization. The second variation is applied to the scene description to produce a final scene description. An image is rendered using the final scene description.

18 Claims, 6 Drawing Sheets

(51) Int. Cl.
    *G06T 19/00*     (2011.01)
    *G06T 13/20*     (2011.01)
    *G06T 15/00*     (2011.01)

(58) Field of Classification Search
    USPC .......................................................... 345/419
    See application file for complete search history.

(56) References Cited

U.S. PATENT DOCUMENTS

| | | |
|---|---|---|
| 5,329,360 A | 7/1994 | Gillard et al. |
| 5,438,661 A | 8/1995 | Ogawa |
| 5,675,752 A | 10/1997 | Scott et al. |
| 5,808,617 A | 9/1998 | Kenworthy et al. |
| 5,808,625 A | 9/1998 | Picott et al. |
| 5,896,139 A * | 4/1999 | Strauss .......................... 345/440 |
| 5,936,628 A | 8/1999 | Kitamura et al. |
| 5,982,389 A | 11/1999 | Guenter et al. |
| 5,986,667 A | 11/1999 | Jevans |
| 6,154,215 A | 11/2000 | Hopcroft et al. |
| 6,243,856 B1 | 6/2001 | Meyer et al. |
| 6,252,608 B1 | 6/2001 | Snyder et al. |
| 6,263,103 B1 | 7/2001 | Freeman et al. |
| 6,263,496 B1 | 7/2001 | Meyer et al. |
| 6,272,650 B1 | 8/2001 | Meyer et al. |
| 6,362,822 B1 | 3/2002 | Randel |
| 6,496,190 B1 | 12/2002 | Driemeyer et al. |
| 6,556,200 B1 | 4/2003 | Pfister et al. |
| 6,563,504 B1 | 5/2003 | Rose et al. |
| 6,611,262 B1 * | 8/2003 | Suzuki .......................... 345/419 |
| 6,760,485 B1 | 7/2004 | Gilman et al. |
| 6,919,891 B2 | 7/2005 | Schneider et al. |
| 7,174,039 B2 | 2/2007 | Koo et al. |
| 7,414,626 B1 | 8/2008 | Picott |
| 7,439,982 B2 * | 10/2008 | Deniau et al. ................ 345/581 |
| 7,548,238 B2 | 6/2009 | Berteig et al. |
| 7,911,472 B2 | 3/2011 | Harper |
| 7,920,143 B1 | 4/2011 | Haratsch et al. |
| 8,009,176 B2 | 8/2011 | Zimmer |
| 8,259,110 B1 | 9/2012 | Carr et al. |
| 8,274,506 B1 | 9/2012 | Rees |
| 8,339,402 B2 | 12/2012 | Henson et al. |
| 8,352,397 B2 | 1/2013 | Rubin et al. |
| 8,352,443 B1 | 1/2013 | Polson et al. |
| 8,369,564 B2 | 2/2013 | Hervas et al. |
| 8,612,485 B2 | 12/2013 | Selan et al. |
| 8,624,898 B1 | 1/2014 | Bugaj et al. |
| 8,773,433 B1 | 7/2014 | Smyrl |
| 2001/0027388 A1 | 10/2001 | Beverina et al. |
| 2002/0063704 A1 | 5/2002 | Sowizral et al. |
| 2002/0099684 A1 | 7/2002 | Ardoin et al. |
| 2002/0128841 A1 | 9/2002 | Kibre et al. |
| 2002/0140707 A1 | 10/2002 | Samra et al. |
| 2002/0163518 A1 * | 11/2002 | Rising et al. ................. 345/440 |
| 2002/0188613 A1 | 12/2002 | Chakraborty et al. |
| 2003/0156117 A1 | 8/2003 | Higuchi et al. |
| 2004/0052450 A1 | 3/2004 | Morrison |
| 2004/0109501 A1 | 6/2004 | Wollborn |
| 2004/0160445 A1 | 8/2004 | Whatmough |
| 2004/0189668 A1 | 9/2004 | Beda et al. |
| 2004/0194020 A1 | 9/2004 | Beda et al. |
| 2004/0222989 A1 | 11/2004 | Zhang et al. |
| 2004/0222992 A1 | 11/2004 | Calkins et al. |
| 2005/0039176 A1 | 2/2005 | Fournie |
| 2005/0110790 A1 | 5/2005 | D'Amora |
| 2005/0140672 A1 | 6/2005 | Hubbell |
| 2005/0140694 A1 | 6/2005 | Subramanian et al. |
| 2005/0248565 A1 | 11/2005 | Grassia et al. |
| 2005/0253839 A1 | 11/2005 | Bugaj et al. |
| 2005/0256950 A1 | 11/2005 | Suzuki |
| 2005/0262470 A1 * | 11/2005 | Gavrilov ....................... 717/100 |
| 2006/0176403 A1 | 8/2006 | Gritton et al. |
| 2007/0080964 A1 | 4/2007 | Kainz et al. |
| 2007/0146361 A1 | 6/2007 | Hayashi et al. |
| 2007/0176926 A1 | 8/2007 | Garci et al. |
| 2007/0185881 A1 | 8/2007 | Vienneau et al. |
| 2008/0028414 A1 | 1/2008 | Couture-Gagnon et al. |
| 2008/0049033 A1 | 2/2008 | Yang |
| 2008/0109717 A1 | 5/2008 | Krauter |
| 2008/0117216 A1 | 5/2008 | Dorie |
| 2008/0122838 A1 | 5/2008 | Hoover et al. |
| 2008/0231633 A1 | 9/2008 | Keller et al. |
| 2008/0238916 A1 | 10/2008 | Ghosh et al. |
| 2008/0278482 A1 * | 11/2008 | Farmanbar et al. .......... 345/419 |
| 2009/0021513 A1 | 1/2009 | Joshi et al. |
| 2009/0027380 A1 | 1/2009 | Rajan et al. |
| 2010/0079462 A1 | 4/2010 | Breeds et al. |
| 2010/0086200 A1 | 4/2010 | Stankiewicz et al. |
| 2010/0123723 A1 | 5/2010 | Collard et al. |
| 2010/0134501 A1 * | 6/2010 | Lowe et al. ................... 345/474 |
| 2010/0177104 A1 | 7/2010 | Dufour et al. |
| 2010/0214284 A1 | 8/2010 | Rieffel et al. |
| 2010/0214313 A1 | 8/2010 | Herman et al. |
| 2010/0289804 A1 | 11/2010 | Jackman et al. |
| 2010/0302249 A1 | 12/2010 | Fowler et al. |
| 2010/0322358 A1 | 12/2010 | Drumm et al. |
| 2011/0090236 A1 | 4/2011 | Calsyn et al. |
| 2011/0106843 A1 | 5/2011 | Pan et al. |
| 2011/0181606 A1 | 7/2011 | Sumner et al. |
| 2011/0182479 A1 | 7/2011 | Sese et al. |
| 2011/0206200 A1 | 8/2011 | Sovio et al. |
| 2011/0234587 A1 | 9/2011 | Maigret et al. |
| 2011/0316854 A1 | 12/2011 | Vandrovec |
| 2012/0095745 A1 | 4/2012 | Le Guevel-Scholtens et al. |
| 2012/0113125 A1 | 5/2012 | Guerrab et al. |
| 2012/0166446 A1 | 6/2012 | Bowman et al. |
| 2012/0280991 A1 | 11/2012 | Maloney et al. |
| 2012/0280995 A1 | 11/2012 | Anderson |
| 2012/0284664 A1 | 11/2012 | Zhao |
| 2013/0063460 A1 | 3/2013 | Marison et al. |
| 2013/0063472 A1 | 3/2013 | Marison et al. |
| 2013/0090850 A1 | 4/2013 | Mays |
| 2013/0120421 A1 | 5/2013 | Maguire |
| 2013/0120422 A1 | 5/2013 | Rao et al. |
| 2013/0127891 A1 | 5/2013 | Kim et al. |
| 2014/0035908 A1 | 2/2014 | Powell et al. |
| 2014/0059564 A1 | 2/2014 | Vigneras et al. |
| 2014/0108485 A1 | 4/2014 | Geibel et al. |
| 2015/0042654 A1 | 2/2015 | Segasby et al. |

FOREIGN PATENT DOCUMENTS

| | | |
|---|---|---|
| EP | 1918880 A2 | 5/2008 |
| EP | 1918881 A2 | 5/2008 |
| EP | 1990776 A2 | 11/2008 |
| EP | 2187355 A1 | 5/2010 |
| EP | 2779100 A1 | 9/2014 |
| WO | 01/63561 A1 | 8/2001 |
| WO | 2005/114587 A1 | 12/2005 |
| WO | 2005/114589 A1 | 12/2005 |
| WO | 2006/094199 A2 | 9/2006 |
| WO | 2007/005739 A2 | 1/2007 |
| WO | 2007146800 A2 | 12/2007 |
| WO | 2007146800 A3 | 12/2007 |
| WO | 2010/035141 A2 | 4/2010 |
| WO | 2012/174128 A1 | 12/2012 |
| WO | 2013/036691 A1 | 3/2013 |

OTHER PUBLICATIONS

"Intro to Animation", Power Point Presentation, available online at <http://visservices.sdsc.edu/courses/maya/spring06/introtoanim.ppt>, accessed on Apr. 30, 2013, 32 pages.
"JUNG (Java Universal Network/Graph) Framework Manual, Filtering", available online at <http://jung.sourceforge.net/doc/manual.html#filter>, retrieved on Apr. 30, 2013, 13 pages.
"WebKit Coordinated Graphics System", available online at <http://trac.webkit.org/wiki/CoordinatedGraphicsSystem>, retrieved on Apr. 30, 2013, 9 pages.
Carstarphen, John, "Lighting Effects in Cinema 4D Animation", available online at <http://www.ehow.com/video_4444919_lighting-effects-cinema-4d-animation.html>, retrieved on Apr. 30, 2013, 2 pages.

(56) References Cited

OTHER PUBLICATIONS

Illinois Simulator Lab, "Syzygy Documentation: Programming and Application Frameworks", available online at <http://syzygy.isl.uiuc.edu/szg/doc/Programming.html>, retrieved on Apr. 30, 2013, Dec. 17, 2012, 11 pages.
Lu et al. "Knowledge-Based Digital Media Processing: Generic Object Registration using Multiple Hypotheses Testing in Partition Trees", IEE Proc.—Vis. Image Signal Process, vol. 153, No. 3, Jun. 2006, pp. 323-330.
Oishi et al., "Parallel Alignment of a Large Number of Range Images", Proceedings of the Fourth International Conference on 3-D Digital Imaging and Modeling (3DIM'03), IEEE Computer Society, 2003, 8 pages.
Techfuels, "The Lighting Scene in 3D Animation", available online at <http://www.techfuels.com/applications/9895-lighting-scene-3d-animation.html>, retrieved on Apr. 30, 2013, 3 pages.
Toon Boom Animation, "Lighting Effects", available online at <http://beta.toonboom.com/home-users/toon-boom-studio/resources/tips-and-tricks/lighting-effects>, retrieved on Apr. 30, 2013, 2 pages.
Van Der Beek, Jelle, "Dependency Graphs in Games", Gamasutra the Art & Business of Making Games, available at <http://www.gamasutra.com/view/feature/131221/dependency_graphs_in_games.php?print=1>, accessed on Apr. 30, 2013, 15 pages.
Extended European Search Report received for European Patent Application No. 14160117.9, mailed on May 26, 2014, 7 pages.
Open Inventor Toolkit Tutorial, "Chapter 3. Nodes and Groups and Chapter 4. Cameras and Lights", Available at <http://www-evasion.imag.fr/Membres/Francois.Faure/doc/inventorMentor/sgi_html/ch03.html>, Retrieved on Oct. 18, 2013, 61 pages.
Schmalstieg et al., "Modeling and Rendering of Outdoor Scenes for Distributed Virtual Environments", ACM VRST '97 Lausanne Switzerland, 1997, pp. 209-215.
Sun Microsystems, "Reusing Scene Graphs", Java 3D API Specification, Available at <http://docs.oracle.com/cd/E17802_01/j2se/javase/technologies/desktop/java3d/forDevelopers/j3dguide/SceneGraphSharing.doc.html>, Jun. 1999, pp. 1-11.
Ex-Parte Quayle Action received for U.S. Appl. No. 13/831,482, mailed on Nov. 24, 2014, 7 pages.
International Search Report and Written Opinion received for PCT Patent Application No. PCT/US2014/026792, mailed on Aug. 11, 2014, 7 pages.
International Search Report & Written Opinion received for PCT Patent Application No. PCT/US2014/026799, mailed on Sep. 26, 2014, 11 pages.
Non Final Office Action received for U.S. Appl. No. 13/844,424, mailed on Oct. 28, 2014, 10 pages.
Dollner, et al., "Object-Oriented 3D Modelling, Animation and Interaction", The Journal of Visualization and Computer Animation, vol. 8, 1997, pp. 33-64.
Wernecke, Josie, "The Inventor Mentor: Programming Object-Oriented 3D Graphics with Open Inventor™, Release 2", Addison-Wesley Publishing Company, Chapter 3. Nodes and Groups, 1994, 20 pages.
Merriam-Webster Dictionary "perspective", merriam-webster.com/dictionary/perspective, last visited Aug. 27, 2015.
"Perspective—definition of perspective by the Free Dictionary", Thefreedictionary.com/perspective, last visited Aug. 27, 2015.
"Play/Stop 3ds Max Autodesk Knowledge Network", Autidesk Inc., available online at <http://knowledge.autodesk.com/support/3ds-max/learnexplore/caas/CloudHelp/cloudhelp/2015/ENU/3DSMax/files/GUID-4DC44019-A6BA-40F4-B860-520AD1B16AB7-htm.html>, Dec. 17, 2014, 4 pages.
Notice of Allowance received for U.S. Appl. No. 13/831,482, mailed on Aug. 31, 2015, 5 pages.
Final Office Action received for U.S. Appl. No. 13/843,980 mailed on Sep. 2, 2015, 20 pages.
Notice of Allowance received for U.S. Appl. No. 13/844,016, mailed on Aug. 21, 2015, 10 pages.
Notice of Allowance received for U.S. Appl. No. 13/844,016, mailed on Oct. 22, 2015, 2 pages.
Final Office Action received for U.S. Appl. No. 13/844,363, mailed on Aug. 6, 2015, 12 pages.
Notice of Allowance received for U.S. Appl. No. 13/844,424, mailed on Nov. 5, 2015, 10 pages.
Final Office Action received for U.S. Appl. No. 13/844,497 mailed on Sep. 28, 2015, 28 pages.
Extended European Search Report received for European Patent Application No. 14159918.3, mailed on Nov. 12, 2015, 8 pages.
Extended European Search Report received for European Patent Application No. 141600023, mailed on Dec. 3, 2015, 10 pages.
Extended European Search Report (includes Supplementary European Search Report and Search Opinion) received for European Patent Application No. 14160115.3, mailed on Jul. 28, 2015, 6 pages.
Fisher et al., "Characterizing Structural Relationships in Scenes Using Graph Kernels", ACM Siggraph 2011 papers, XP055222613, Vancouver, British Columbia, Canada, Aug. 7, 2011, pp. 34:1-34:12.
International Preliminary Report on Patentability received for PCT Patent Application No. PCT/US2014/026792, mailed on Sep. 24, 2015, 6 pages.
International Preliminary Report on Patentability received for PCT Patent Application No. PCT/US2014/026799, mailed on Sep. 24, 2015, 8 pages.
Walker, ACJ, "CGTalk—Viewing Animation in Multiple Viewports", CGSociety, available online at <http://forums.cgsociety.org/archive/index.php?t512252.html>, Jun. 28, 2007, 3 pages.
Young et al., "Cantata: Visual Programming Environment for the Khoros System", Computer Graphics, ACM. US, vol. 29, No. 2, May 1, 1995, pp. 22-24.
Open Inventor toolkit Tutorial, Chapter 3. Nodes and Groups and Chapter 4. Cameras and Lights, Retrieved from the Internet:URL:http://www-evasion.imag.fr/Membres/Francois.FaurejdocjinventorMentorjsgi html/ch03.html> on Oct. 18, 2013, 61 pages.
Robocopy.exe Robust File Copy Utility Version XP010, Microsoft Corporation, 2003, pp. 1-35.
Final Office Action received for U.S. Appl. No. 13/831,309, mailed on Jun. 5, 2015, 8 pages.
Non-Final Office Action received for U.S. Appl. No. 13/831,309, mailed on Feb. 24, 2015, 8 pages.
Non-Final Office Action received for U.S. Appl. No. 13/831,482, mailed on Apr. 20, 2015, 8 pages.
Notice of Allowance received for U.S. Appl. No. 13/831,482, mailed on Mar. 4, 2015, 5 pages.
Non Final Office Action received for U.S. Appl. No. 13/843,980, mailed on Feb. 5, 2015, 15 pages.
Non Final Office Action received for U.S. Appl. No. 13/844,016, mailed on Feb. 5, 2015, 23 pages.
Non Final Office Action received for U.S. Appl. No. 13/844,113, mailed on Apr. 10, 2015, 10 pages.
Non-Final Office Action received for U.S. Appl. No. 13/844,363, mailed on Feb. 24, 2015, 9 pages.
Non-Final Office Action received for U.S. Appl. No. 13/844,380, mailed on Apr. 2, 2015, 9 pages.
Final Office Action received for U.S. Appl. No. 13/844,424, mailed on Apr. 7, 2015, 10 pages.
Non-Final Office Action received for U.S. Appl. No. 13/844,497, mailed on Mar. 13, 2015, 21 pages.
Extended European Search Report (includes Supplementary European Search Report and Search Opinion) received for European Patent Application No. 14160119.5, mailed on Jun. 30, 2015, 11 pages.
Bederson, et al., "Toolkit Design for Interactive Structured Graphics", IEEE Transactions on Software Engineering, vol. 30, No. 8, Aug. 2004, pp. 535-546.
Cheng, et al., "High-Extensible Scene Graph Framework Based on Component Techniques", Journal of Zhejiang University Science A, vol. 7. No. 7, 2006, pp. 1247-1252.

(56) References Cited

OTHER PUBLICATIONS

Dobos, et al., "3D Revision Control Framework", Web3D, 2012, pp. 121-129.
Dollner, et al., "Object -Oriented 3D Modelling, Animation and Interaction", The Journal of Visualization and Computer Animation, vol. 8, 1997, pp. 33-64.
Invitation to pay additional fees received for PCT Patent Application No. PCT/US2014/026799, mailed on Jul. 25, 2014, 2 pages.
Rossler, et al., "Dynamic Shader Generation for Flexible Multi-Volume Visualization", Visualization Symposium, Mar. 2008, pp. 17-24.
Tobler, Robert F., "Separating semantics from rendering: a scene graph based architecture for graphics applications", Visual Computer, vol. 27, 2011, pp. 687-695.
Wernecke, Josie, "The Inventor Mentor: Programming Object-Oriented 3D Graphics with Open Intentor™, Release 2", Addison-Wesley Publishing Company, Chapter 3. Nodes and Groups, 1994, 20 pages.
Notice of Allowance received for U.S. Appl. No. 13/831,309, mailed on Jul. 21, 2015, 12 pages.
Notice of Allowance received for U.S. Appl. No. 13/844,380, mailed on Jul. 17, 2015, 7 pages.
Office Action Received for Chinese Patent Application No. 201480000143.0, dated May 2, 2017, 13 pages (6 pages of English Translation and 7 pages of Official Copy).
Adamsen, Mikkel, "ReRendering", Available at <http://image.diku.dk/projects/media/mikkel.adamsen.07.pdf, Sep. 24, 2007, 19 pages.
Advisory Action received for U.S. Appl. No. 13/843,980, dated Jan. 5, 2016, 8 pages.
Advisory Action received for U.S. Appl. No. 13/844,497, dated Mar. 16, 2016, 4 pages.
Barzel, Ronen, "Lighting Controls for Computer Cinematography", Journal of Graphics Tools, vol. 2, No. 1, Jan. 1, 1997, 19 pages.
Bittner et al., "Coherent Hierarchical Culling: Hardware Occlusion Queries Made Useful", Eurographics, vol. 23, No. 3, 2004, 10 pages.
Extended European Search Report (includes Partial European Search Report and Search Opinion) received for European Patent Application No. 14159965.4, dated Jul. 20, 2016, 16 pages.
Extended European Search Report received for European Patent Application No. 14159928.2, dated Mar. 22, 2016, 15 pages.
Extended European Search Report received for European Patent Application No. 14160025.4, dated Aug. 9, 2016, 6 pages.
Extended European Search Report received for European Patent Application No. 14714565.0, dated Nov. 3, 2016, 7 pages.
Extended European Search Report received for European Patent Application No. 14714566.8, dated Nov. 4, 2016, 11 pages.
Final Office Action received for U.S. Appl. No. 13/843,980, dated Sep. 22, 2016, 22 pages.
Gould, David, "Complete Maya Programming—An Extensive Guide to Mel and C++ API", The Morgan Kaufmann Series in Computer Graphics and Geometric Modelling, 2003, 51 pages.
Harrison, Dave, "Evaluation of Open Source Scene Graph Implementations", Visualization & Virtual Reality Research Group School of Computing, 2007, 14 pages.
Mendez et al., "Generating Semantic 3D Models of Underground Infrastructure", IEEE Computer Graphics and Applications, vol. 28, No. 33, May/Jun. 2008, pp. 48-57.
Mendez et al., "Interactive Context-Driven Visualization Tools for Augmented Reality", Mixed and Augmented Reality, 2006. ISMAR 2006, IEEE/ACM International Symposium on, 2006, pp. 209-218.
Non-Final Office Action received for U.S. Appl. No. 13/843,980, dated Mar. 16, 2016, 24 pages.
Notice of Allowance received for U.S. Appl. No. 13/844,113, dated Jan. 29, 2016, 11 pages.
Notice of Allowance received for U.S. Appl. No. 13/844,113, dated May 10, 2016, 10 pages.
Notice of Allowance received for U.S. Appl. No. 13/843,980, dated Jan. 12, 2017, 5 pages.
Notice of Allowance received for U.S. Appl. No. 13/844,113, dated Nov. 4, 2016, 7 pages.
Notice of Allowance received for U.S. Appl. No. 13/844,113, dated Sep. 8, 2016, 10 pages.
Notice of Allowance received for U.S. Appl. No. 13/844,363, dated Dec. 9, 2016, 7 pages.
Notice of Allowance received for U.S. Appl. No. 13/844,363, dated Jun. 16, 2016, 7 pages.
Notice of Allowance received for U.S. Appl. No. 13/844,497, dated Jan. 27, 2017, 7 pages.
Office Action received for European Patent Application No. 14160115.3, dated Mar. 15, 2017, 3 pages.
Partial European Search Report received for European Patent Application No. 14159965.4, dated Apr. 1, 2016, 9 pages.
Partial European Search Report received for European Patent Application No. 14714566.8, dated Aug. 1, 2016, 5 pages.
Pellacini et al., "A User Interface for Interactive Cinematic Shadow Design", ACM Translation on Graphics, vol. 21. No. 3, Jul. 1, 2002, pp. 563-566.
Ragan-Kelley et al., "The Lightspeed Automatic Interactive Lighting Preview System", ACM Transactions on Graphics, vol. 26, No. 3, Article 25, Jul. 2007, pp. 25.1-25.11.
Supplemental Notice of Allowance received for U.S. Appl. No. 13/343,980, dated Apr. 14, 2017, 2 pages.
Watt et al., "LibEE: A Multithreaded Dependency Graph for Character Animation", Proceedings of the Digital Production Symposium on DIGIPRO '12, 2012, pp. 59-66.
Office Action received for European Patent Application No. 14160119.5, dated May 12, 2017, 4 pages.

* cited by examiner

LEVEL-BASED DATA SHARING FOR DIGITAL CONTENT PRODUCTION

BACKGROUND

1. Field

The present disclosure relates to computer-generated scene data and, more specifically, to computer-generated scene data using directed acyclic graphs.

2. Related Art

A computer-generated animation is typically created by rendering a sequence of images, with each image depicting a computer-generated scene composed of one or more computer-generated assets (e.g., a character, a group of characters, an environment, an effect, or a lighting rig). Frequently, the computer-generated images illustrate different scenes containing the same assets. For example, a scene may depict a male character during daytime hours, and a different scene may depict the same character during nighttime hours. In this example, the character may be clean-shaven during daytime hours, but may have stubble or other differences in appearance during nighttime hours.

Traditional techniques for rendering images require managing various implementations of assets when the assets have different characteristics in different scenes. However, maintaining numerous separate versions of an asset presents challenges. One particularly challenging aspect of maintaining separate versions of an asset is the difficulty in applying the same change across some or all versions of the asset.

Referring back to the example above, two versions of the same character are traditionally maintained: a first asset representing the character as clean-shaven for use in scenes depicting daytime hours and a second asset representing the character as having stubble for use in scenes depicting nighttime hours. A modification to the character during animation production may require that a change be applied to all versions of the character. As an example, production may require changes in the nose and chin structure of the character. Implementing this same change to both character assets is a time-consuming and computer-intensive task.

It is therefore desirable to use a technique for sharing digital content in a manner that reduces the need for maintaining multiple independent versions of an asset.

SUMMARY

Processes for rendering three-dimensional images using a level graph are described. One example process may include accessing the level graph. The level graph comprises a first node, a second node, and a target node. The second node and target node are descendants of the first node. The first node comprises a first scene description data, the second node comprises a first variation data, and the target node comprises a second variation data. A selection of the target node for computation is received. Ancestors of the target node are determined. The first node and the second node are ancestors of the target node. A linearization of the ancestors of the target node is determined. The linearization comprises an order of the ancestors of the target node. A scene description is initialized using the first scene description data of the first node. The first variation of the second node is applied to the scene description, based on the linearization, to produce an updated scene description. The second variation of the target node is applied to the updated scene description to produce a final scene description. An image is rendered based on the final scene description.

Systems and computer-readable storage media for rendering three-dimensional images using a level graph are also described.

BRIEF DESCRIPTION OF THE FIGURES

The present application can be best understood by reference to the following description taken in conjunction with the accompanying drawing figures, in which like parts may be referred to by like numerals.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the present technology. Thus, the disclosed technology is not intended to be limited to the examples described herein and shown, but is to be accorded the scope consistent with the claims.

For descriptive purposes, throughout this disclosure, software, software modules, software objects, and the like may be described as performing various functions. One of ordinary skill in the art, however, will recognize that software may not actively perform any function and instead may include instructions that are executable on a computer processor. As such, although software may be described herein as performing a function, it should be appreciated that a computer processor or other computing device may typically perform those functions attributed herein to software modules or objects by executing computer instructions provided by the software modules or objects.

A computer-generated animation is typically created by rendering a sequence of images, each image depicting a computer-generated scene composed of one or more computer-generated assets. Light sources, materials, textures, and other visual effects may be associated with a computer-generated object to create a realistic visual appearance for the computer-generated scene. For purposes of this discussion, a computer-generated scene generally refers to the virtual three-dimensional (3D) space that may be filmed using a virtual camera, and may also be referred to generically as a scene.

Various embodiments are described below relating to producing digital content. Digital content may refer to parametric scene description data. Portions of the scene description data are reused in multiple sites. Sites may refer to individual shots or groups of shots. Base data refers to asset definitions, such as for characters, environments, and lighting rigs. Modifications refer to alterations to be applied to scene description data.

Figure 1B:
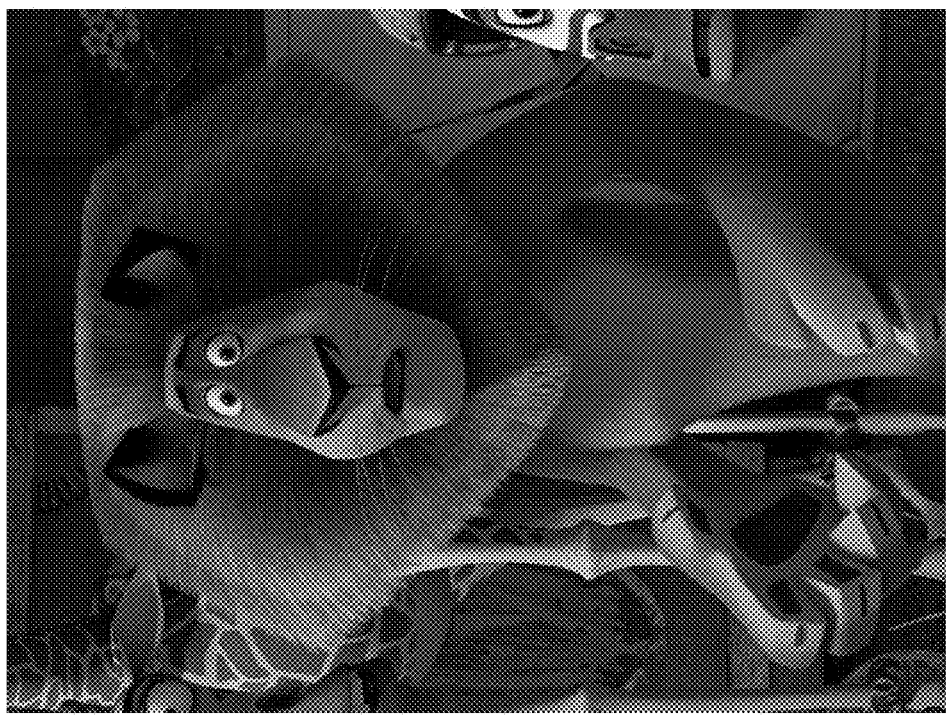
FIGS. 1A-B depict exemplary computer-generated images that may be rendered using level-based data sharing according to various embodiments.
Figure 1A:
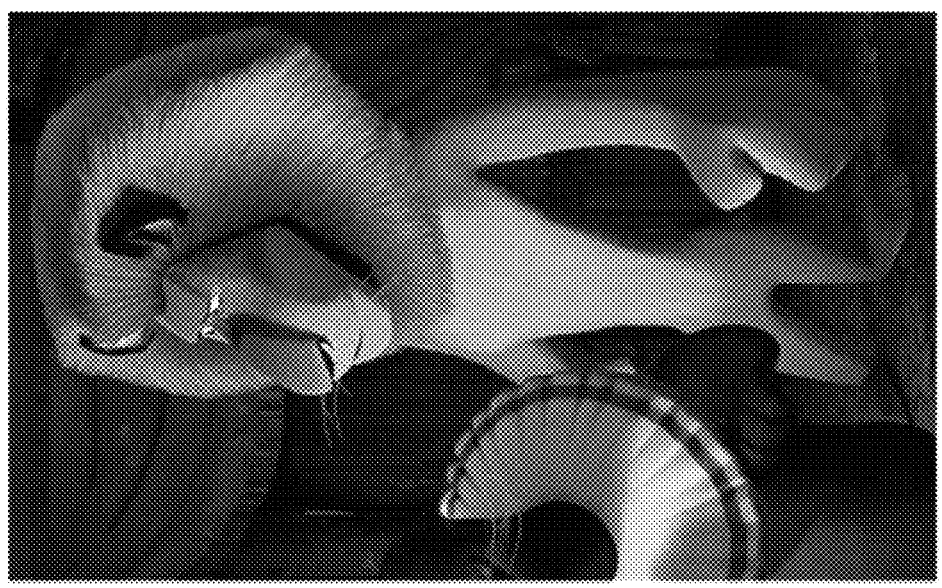

FIGS. 1A-B depict exemplary computer-generated images that may be rendered using level-based data sharing according to various embodiments. FIG. 1A illustrates an asset—a personified lion character—depicted in a daytime scene. An animator or artist may prefer the lion character to have short facial hair in the series of shots that occur in the daytime scene to produce a daytime animation. FIG. 1B illustrates the same lion character, but depicted in a nighttime scene. An animator or artist may prefer for the lion character to have long facial hair in the series of shots that occur in the nighttime scene to produce a nighttime animation. This gives the appearance that time has passed, allowing for the lion character's facial hair to grow during the day. Traditionally, this required maintaining the two lion characters as two separate assets—each with its own characteristics and data describing the asset.

Using level-based data sharing, the same lion asset can be efficiently used for various shots where the visual characteristics of the lion character differ based on the shot. Because the same asset is used as the base for producing the various depictions of the lion character in the various shots, even a fundamental change to the lion character, such as a change in the lion character's facial structure, may easily be applied to all shots where the lion asset is used. This speeds up production of animation and reduces computational complexity for rendering purposes.

Figure 2:
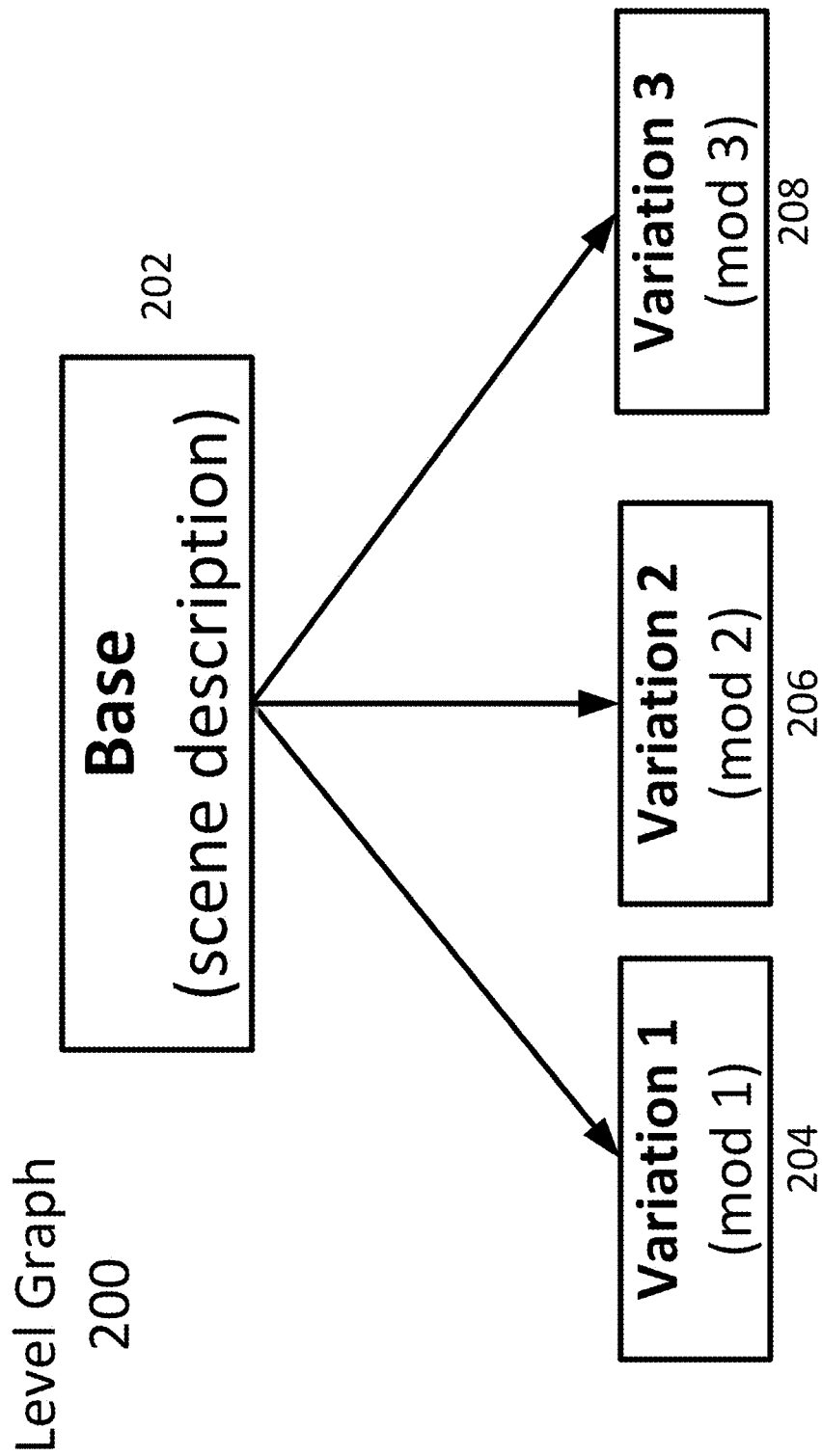
FIG. 2 illustrates an exemplary level graph for use in content production.

FIG. 2 illustrates an exemplary level graph 200 for use in content production. A level graph is a directed acyclic graph. The level graph includes a scene description. A scene description may be a data format or a language for describing an asset. Scene description data are used either directly or passed to another process, such as a rendering process, to produce an image or series of images. Modifications, or "deltas," are used to describe alterations to a scene description data or to other modifications. Therefore, given a scene description and a set of deltas, various new scene descriptions can be produced.

A level graph is defined as part of the animation production process. Each node in the level graph is called a level node, and contains either scene description data, modifications, or both. Each level of the graph may produce a scene description (e.g., a "level") by merging contents from incoming edges with the node's own contents. A node at the start of an edge may be referred to as a parent, and a node at the end of an edge may be referred to as a child.

In the example of FIG. 2, a base node 202 is a parent to three child nodes, each of which contain a variation for the base scene description data. The three child nodes are variation node 204, variation node 206, and variation node 208. Base node 202 is associated with a scene description data. Variation node 204 is associated with a variation, which is labeled "mod 1." Variation node 206 is associated with a variation, which is labeled "mod 2." Variation node 208 is associated with a variation, which is labeled "mod 3."

In one example, a system receives a request to produce a scene description at the level "Variation 1" of variation node 204. The level "Variation 1" of node 204 is the result of applying "mod 1" to the scene description data of base node 202. Assuming that base node 202 describes the lion character asset as intended to be depicted during the daytime without stubble, mod 1 of node 204 may describe the changes required to transform the lion character of base node 202 into a lion character that has stubble and is intended to be depicted during the nighttime.

Using this technique in the course of animation production, users can work on both the base node data and on the variations independently. For example, one user may work updating the scene description data associated with base node 202 by changing the facial structure of the character asset, while a different user works to change the color or texture of the facial hair variation described in variation node 204.

Liveness describes the concept that changes made to a base node may be incorporated when a level is computed at a variation that is a child node of the changed base node. Liveness of sharing data is achieved by the ability to recompute levels at any time. When the level associated with the variation is computed, the changes made to the base node are incorporated into the produced description data. In order to effectively support liveness, content production tools and editing tools may be adapted to deliver changes in the form of deltas.

Additionally, data residing at a child node, such as a variation or description data, may be promoted up through the graph. For example, if production requires that a variation residing at a child node be used in all shots, a user may promote the variation so that it is incorporated at the base node. This way, any level computation that includes the base node will (at least initially) include the promoted variation.

Figure 3:
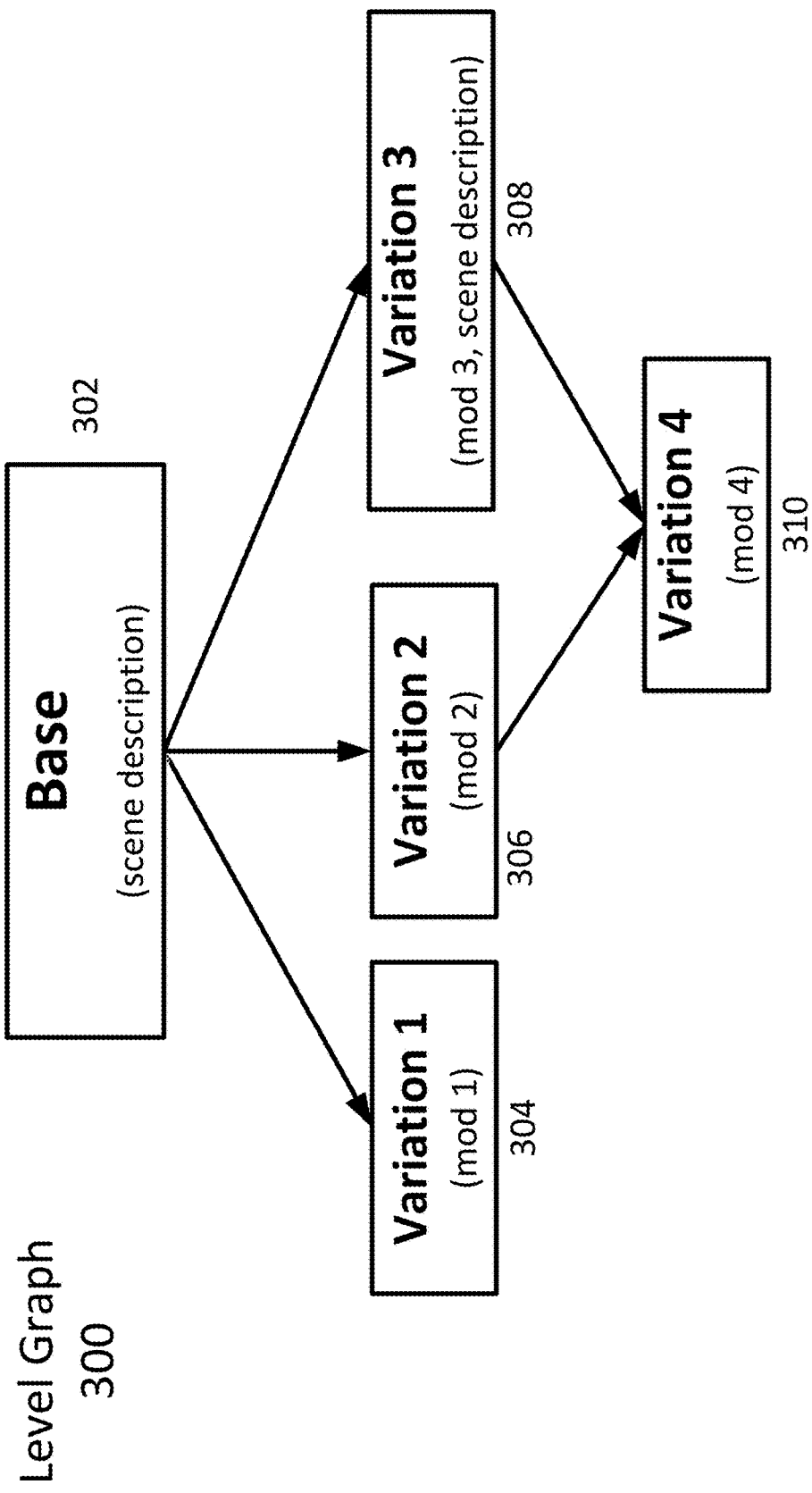
FIG. 3 illustrates another exemplary level graph for use in content production.

FIG. 3 illustrates an exemplary level graph 300 for use in content production. As illustrated in FIG. 3, a level node may have multiple parents, and may contain both scene description data and modification data. In this example, base 302 includes scene description data. Nodes 304, 306, and 310 include modification data. Node 308 includes both modification data and scene description data.

Computing the level at node 310 (mod 4) is done as follows. The process starts with the scene description data of base node 302. A decision is made regarding which of nodes 306 or 308 to process first. The technique for making this decision is called linearization and is described in detail below. Assuming the decision is made to process node 306 before node 308, the modification data of node 306 is applied to the scene description data of base node 302, producing a first intermediate description data. This intermediate description data may be stored in memory. Next, the modification data and scene description data of node 308 is applied to the first intermediate description data to produce a second intermediate description data. When the modification data of node 308 is applied to the first intermediate description data, it modifies the scene description data that was appended at a previous step. When the scene description data of node 308 is appended to the first intermediate result, it does not affect the existing scene description data. Instead, it adds to the scene description data. Next, the modification data of node 310 is applied to the second modification data. Accordingly, the level is computed for node 310 in the level graph 300.

Figure 4:
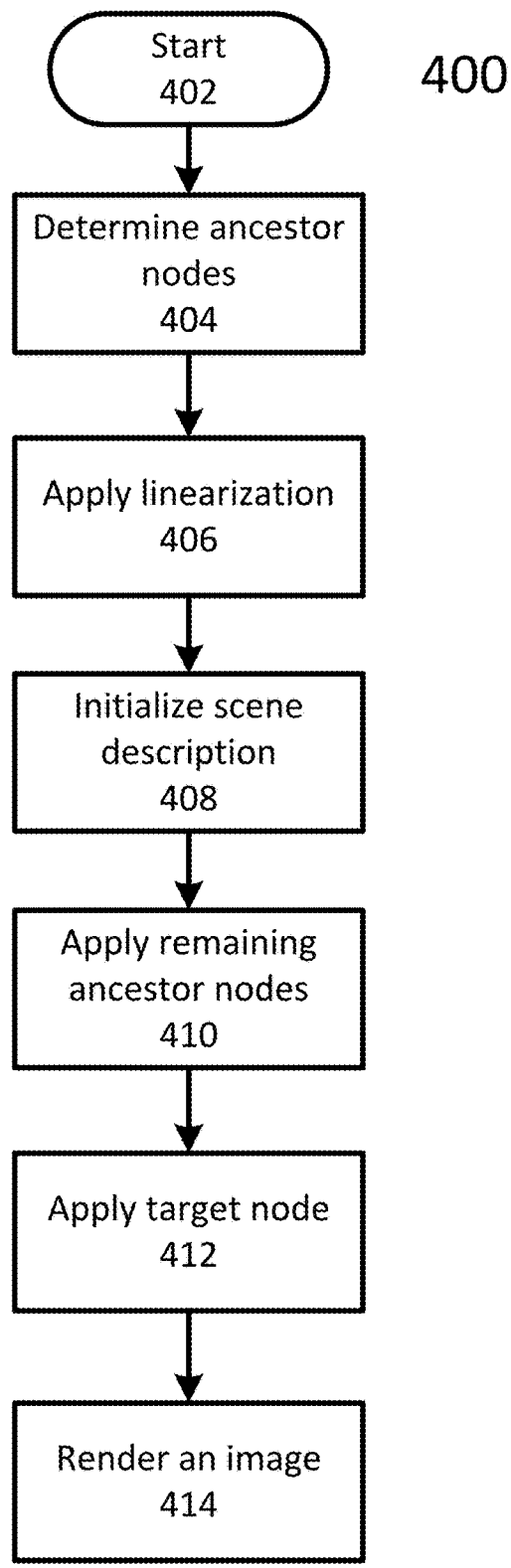
FIG. 4 illustrates an exemplary process for rendering three-dimensional images using a level graph.

FIG. 4 illustrates an exemplary process 400 for computing a level for rendering a three-dimensional image using a level graph. The process begins at block 402 when the system detects a request to process a level associated with a target node. The target node is the node at which the level is being computed. At block 404, the system determines the set of level ancestor nodes of the target node. These are the parents, grandparents, and other ancestors of the target node.

At block 406, the ancestor nodes are ordered into a sequence using a linearization technique. Various linearization techniques are described below. At block 408, a scene description is initialized based on the node in the set of level ancestor nodes that is first in the sequence. This produces an intermediate description data, which may be stored in memory.

At block 410, the process continues by consecutively applying the remaining ancestor nodes of the set of level ancestor nodes to the intermediate description data in sequence, as determined by the linearization technique. The level ancestor nodes may contain scene description data, deltas, or both. In the case of nodes that contain deltas, the operation that applies the delta to the intermediate scene description data may fail. In one example, an operation to apply a delta fails when the operation attempts to apply the delta to non-existent data. In a more specific example, a variation to add facial hair to a character's face fails when the intermediate scene data does not contain the character's face. Thus, the facial hair property cannot be modified. If an operation to apply a delta fails, the node containing the failed delta may be skipped and the entire level computation may be computed without the node containing the failed delta. In one example, if an operation to apply a delta fails, the level computation may halt, and a user may be notified of the failure.

At block 412, the target node is applied to the intermediate description data, resulting in the final level scene description. At block 414, an image is rendered using the final level scene description.

The algorithm used for linearization is significant insofar as the order of applying deltas affects the final level scene description. The cases where deltas do not commute can be characterized as conflicts, and therefore linearization is used to determine how conflicting modifications should be resolved.

A first linearization technique is derived from the "C3 Superclass Linearization" method developed for the programming language Dylan. In the context of level-based data sharing techniques, level graphs play the role of the class inheritance hierarchy. This algorithm requires that users or a process add annotations to the level graph indicating a precedence order for incoming edges.

A second linearization technique relies on an integer tag annotation associated with each level node. The linearization lists ancestor nodes in descending order of tag, with a failure condition when equal tags appear in the same linearization input set. One of ordinary skill in the art will appreciate that other linearization techniques may be applied.

Figure 5:
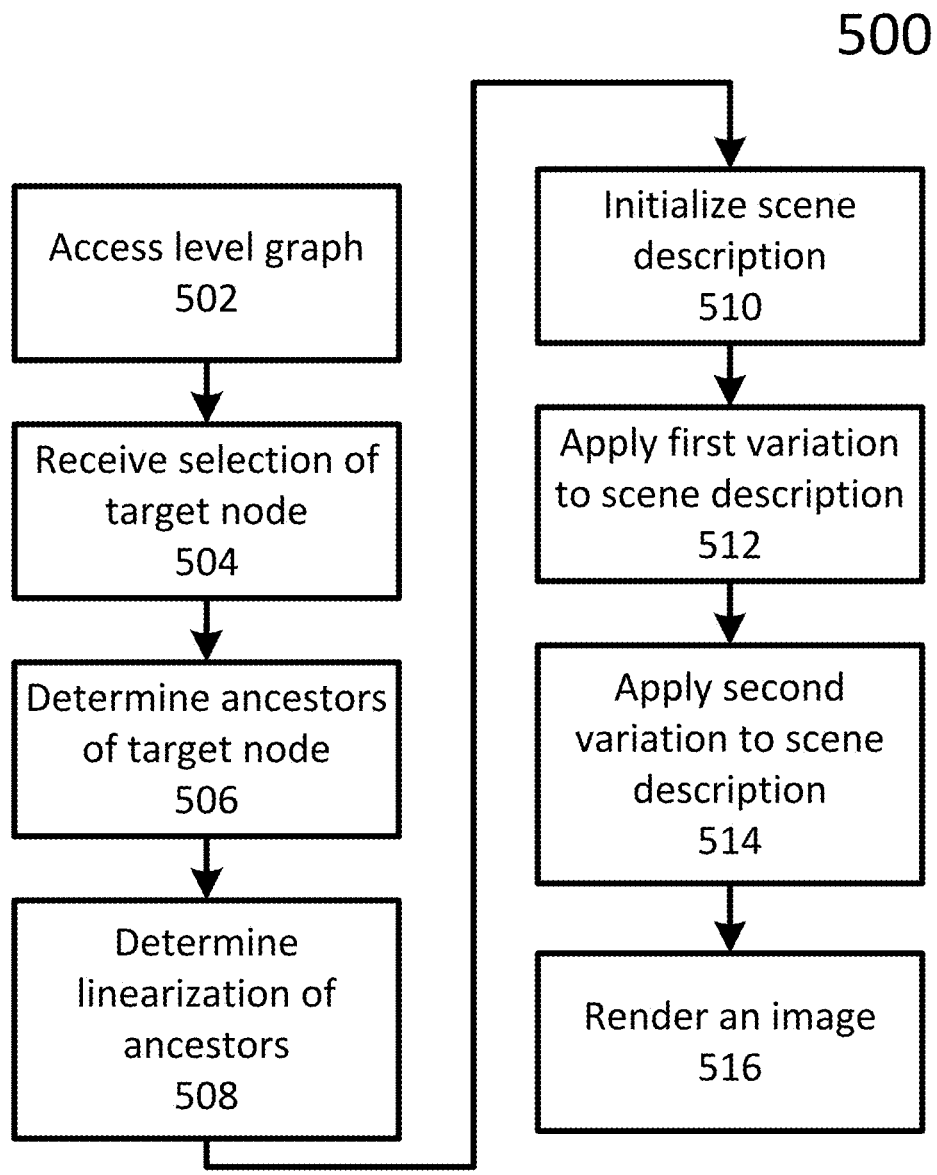
FIG. 5 illustrates an exemplary process for rendering three-dimensional images using a level graph.

FIG. 5 illustrates an exemplary process for rendering three-dimensional images using a level graph. At block 502, the level graph is accessed. The level graph comprises a first node, a second node, and a target node. The second node and target node are descendants of the first node. The first node comprises a first scene description data, the second node comprises a first variation data, and the target node comprises a second variation data. In some examples, the first node is a base node, which is a root node of the level graph. The base node may associated with an asset, such as a character, a group of characters, an environment, an effect, or a lighting rig.

At block 504, a selection of the target node for computation is received. For example, the selection of the target node may be made by an external rendering process or by a user. At block 506, ancestors of the target node are determined. The first node and the second node are ancestors of the target node.

At block 508, a linearization of the ancestors of the target node is determined. The linearization comprises an ordering of at least some of the ancestors of the target node. In one example, the linearization may be based on a C3 superclass linearization algorithm. In another example, the first node comprises a first tag and the second node comprises a second tag. In this example, the linearization of the ancestors comprises ordering the first node and the second node based on their respective tags. In one implementation of this technique, a user may manually determine which nodes should be applied prior to other nodes by appropriately setting the values of the tags. At block 510, a scene description is initialized using the first scene description data of the first node. In one example, the initialization is based on the linearization.

At block 512, the first variation of the second node is applied to the scene description. The first variation is applied based on the linearization. In some examples, the second node further comprises a second scene description data. In that case, the second scene description data is also applied to the scene description. This produces an updated scene description. At block 514, the second variation of the target node is applied to the updated scene description. This produces a final scene description. The final scene description may be data describing an asset. At block 516, an image is rendered based on the final scene description.

Figure 6:
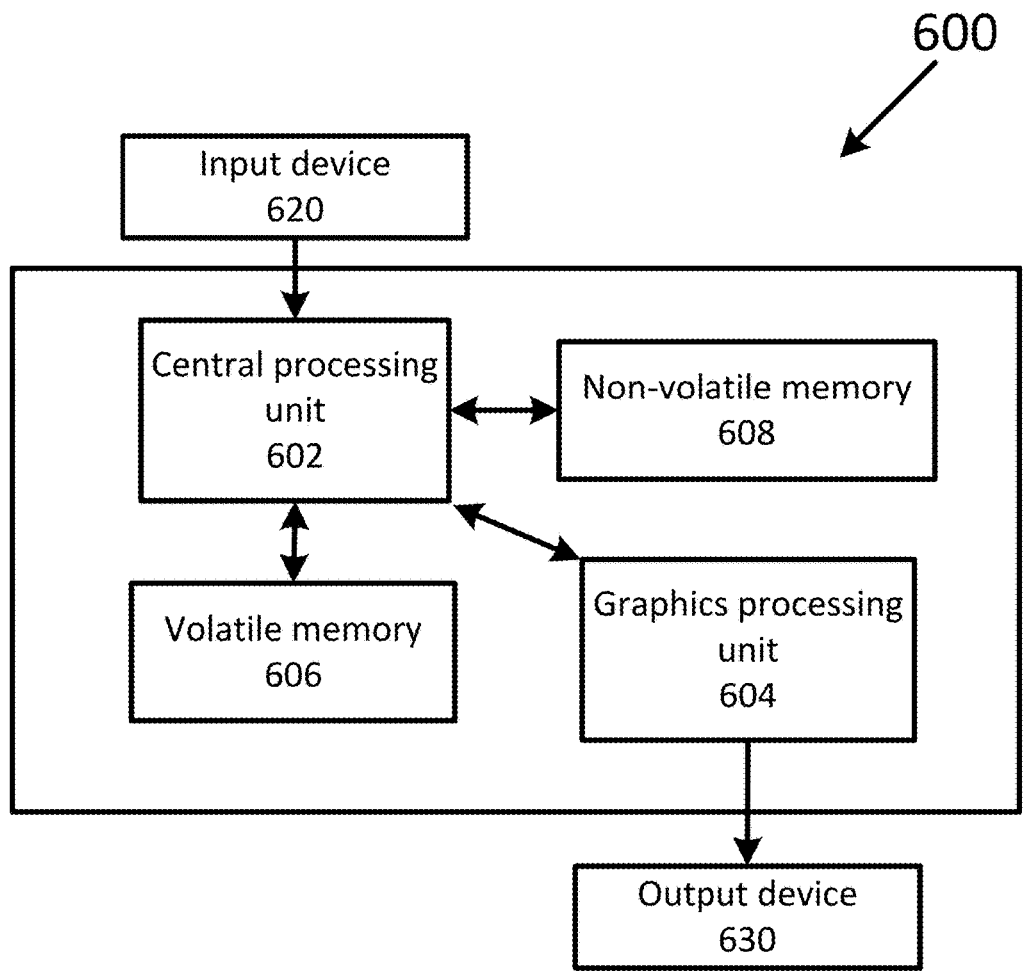
FIG. 6 illustrates an exemplary computing system.

FIG. 6 illustrates an exemplary animation system 600 that can be used to implement the level-based data sharing technique discussed above. The level-based data sharing technique can be implemented, for example, in either hardware or in software stored on a non-transitory computer-readable storage medium.

The animation system 600 can be configured to receive user input from an input device 620. The input device 620 can be any device that receives input from the user and transmits it to the animation system 600. For example, the input device 620 can be a keyboard, a mouse, a tablet, a stylus, or the like. Those skilled in the art will recognize that other types of input devices can also be used.

The animation system 600 can be configured to output graphics, images, or animation to an output device 630. The output device 630 can include any device that receives data from the animation system and presents the data to the user. For example, the output device 630 may include a liquid crystal display, a set of light-emitting diodes, a projector, or the like. Those skilled in the art will recognize that other types of output devices can also be used.

The animation system 600 may further include a central processing unit 602. The central processing unit may include one or more processing cores. The central processing unit 602 may be coupled to and able to communicate with the input device 620. Although the animation system 600 is illustrated with one central processing unit 602, the animation system 600 may include multiple processing units. The animation system 600 may also include a graphics processing unit 604. The graphics processing unit 604 may be dedicated to processing graphics-related data. The graphics processing unit 604 may include a single processing core or multiple processing cores. Although the animation system 600 is illustrated with one graphics processing unit 604, the animation system 600 may include a plurality of graphics processing units. The central processing unit 602 and/or the graphics processing unit 604 may be coupled to and able to communicate data to the output device 630.

In one example, the animation system 600 may include one or more processors and instructions stored in a non-transitory computer-readable storage medium, such as a memory or storage device, that when executed by the one or more processors, perform animation rendering using the level-based data sharing technique described above. In the context of the embodiments described herein, a "non-transitory computer-readable storage medium" can be any medium that can contain or store the program for use by or in connection with the instruction execution system, apparatus, or device. The non-transitory computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The animation system 600 may include volatile memory 606, which is a non-transitory computer-readable storage medium, in communication with the central processing unit 602. The volatile memory 606 may include, for example, random access memory, such as dynamic random access memory or static random access memory, or any other type of volatile memory. The volatile memory 606 may be used to store data or instructions during the operation of the animation system 600. Those skilled in the art will recognize that other types of volatile memory can also be used.

The animation system 600 may also include non-volatile memory 608, which is a non-transitory computer-readable storage medium, in communication with the central processing unit 602. The non-volatile memory 608 may include flash memory, hard disks, magnetic storage devices, read-only memory, or the like. The non-volatile memory 608 may be used to store animation data, level-based data, computer instructions, or any other information. Those skilled in the art will recognize that other types of non-volatile memory can also be used.

The animation system 600 is not limited to the devices, configurations, and functionalities described above. For example, although a single volatile memory 606, non-volatile memory 608, central processing unit 602, graphics processing unit 604, input device 620, and output device 630 are illustrated, a plurality of any of these devices can be implemented internal or external to the animation system 600. In addition, the animation system 600 may include a network access device for accessing information on a network, such as an internal network or the Internet. Those skilled in the art will recognize that other configurations of the animation system 600 can be used.

Various exemplary embodiments are described herein. Reference is made to these examples in a non-limiting sense. They are provided to more broadly illustrate applicable aspects of the disclosed technology. Various changes may be made and equivalents may be substituted without departing from the true spirit and scope of the various embodiments. In addition, many modifications may be made to adapt a particular situation, material, composition of matter, process, process act(s), or step(s) to the objective(s), spirit, or scope of the various embodiments. Further, as will be appreciated by those with skill in the art, each of the individual variations described and illustrated herein has discrete components and features that may be readily separated from or combined with the features of any of the other several embodiments without departing from the scope or spirit of the various embodiments.

What is claimed is:

1. A computer-implemented method for rendering three-dimensional images using a level graph, the method comprising:

accessing the level graph, the level graph comprising a first node, a second node, a third node, and a target node, wherein:
the second node, third node, and target node are descendants of the first node,
the target node or an ancestor of the target node is a direct descendant of both the second node and the third node, and
the first node comprises a first scene description data, the second node comprises a first variation data, the third node comprises a second variation data, and the target node comprises a third variation data;
receiving a selection of the target node for computation;
determining ancestors of the target node, wherein the ancestors of the target node comprises the first node, the second node, and the third node;
determining a linearization of the ancestors of the target node, the linearization comprising an order of the ancestors of the target node;
initializing a scene description using the first scene description data of the first node;
applying the variation data of the second node and the third node, based on the order determined by the linearization, to the scene description to produce an updated scene description;
applying the third variation of the target node to the updated scene description to produce a final scene description; and
rendering an image based on the final scene description.

2. The computer-implemented method of claim 1, wherein the first node is a base node that is a root node.

3. The computer-implemented method of claim 1, wherein initializing the scene description using the scene description data of the first node is based on the linearization.

4. The computer-implemented method of claim 1, wherein the second node further comprises a second scene description data, and wherein the second scene description data is applied to the scene description to produce the updated scene description.

5. The computer-implemented method of claim 1, wherein determining the linearization of the ancestors of the target node comprises determining the linearization of the ancestors of the target node based on a C3 superclass linearization algorithm.

6. The computer-implemented method of claim 1, wherein:
the first node comprises a first tag and the second node comprises a second tag; and
determining the linearization of the ancestors of the target node comprises ordering the first node and the second node based on the first tag and the second tag.

7. A non-transitory computer-readable storage medium comprising computer-executable instructions for rendering three-dimensional images using a level graph, the computer-executable instructions comprising instructions for:
accessing the level graph, the level graph comprising a first node, a second node, a third node, and a target node, wherein:
the second node, third node, and target node are descendants of the first node,
the target node or an ancestor of the target node is a direct descendant of both the second node and the third node, and
the first node comprises a first scene description data, the second node comprises a first variation data, the third node comprises a second variation data, and the target node comprises a third variation data;

receiving a selection of the target node for computation;

determining ancestors of the target node, wherein the ancestors of the target node comprises the first node, the second node, and the third node;

determining a linearization of the ancestors of the target node, the linearization comprising an order of the ancestors of the target node;

initializing a scene description using the first scene description data of the first node;

applying the variation data of the second node and the third node, based on the order determined by the linearization, to the scene description to produce an updated scene description;

applying the third variation of the target node to the updated scene description to produce a final scene description; and rendering an image based on the final scene description.

8. The non-transitory computer-readable storage medium of claim 7, wherein the first node is a base node that is a root node.

9. The non-transitory computer-readable storage medium of claim 7, wherein initializing the scene description using the scene description data of the first node is based on the linearization.

10. The non-transitory computer-readable storage medium of claim 7, wherein the second node further comprises a second scene description data, and wherein the second scene description data is applied to the scene description to produce the updated scene description.

11. The non-transitory computer-readable storage medium of claim 7, wherein determining the linearization of the ancestors of the target node comprises determining the linearization of the ancestors of the target node based on a C3 superclass linearization algorithm.

12. The non-transitory computer-readable storage medium of claim 7, wherein:

the first node comprises a first tag and the second node comprises a second tag; and determining the linearization of the ancestors of the target node comprises ordering the first node and the second node based on the first tag and the second tag.

13. An apparatus for rendering three-dimensional images using a level graph, the apparatus comprising:

a memory configured to store the level graph; and one or more computer processors configured to:

access the level graph, the level graph comprising a first node, a second node, a third node, and a target node, wherein:

the second node, third node, and target node are descendants of the first node, the target node or an ancestor of the target node is a direct descendant of both the second node and the third node, and the first node comprises a first scene description data, the second node comprises a first variation data, the third node comprises a second variation data, and the target node comprises a third variation data;

receive a selection of the target node for computation;

determine ancestors of the target node, wherein the ancestors of the target node comprises the first node, the second node, and the third node;

determine a linearization of the ancestors of the target node, the linearization comprising an order of the ancestors of the target node;

initialize a scene description using the first scene description data of the first node;

apply the variation data of the second node and the third node, based on the order determined by the linearization, to the scene description to produce an updated scene description;

apply the third variation of the target node to the updated scene description to produce a final scene description; and render an image based on the final scene description.

14. The apparatus of claim 13, wherein the first node is a base node that is a root node.

15. The apparatus of claim 13, wherein initializing the scene description using the scene description data of the first node is based on the linearization.

16. The apparatus of claim 13, wherein the second node further comprises a second scene description data, and wherein the second scene description data is applied to the scene description to produce the updated scene description.

17. The apparatus of claim 13, wherein determining the linearization of the ancestors of the target node comprises determining the linearization of the ancestors of the target node based on a C3 superclass linearization algorithm.

18. The apparatus of claim 13, wherein:

the first node comprises a first tag and the second node comprises a second tag; and determining the linearization of the ancestors of the target node comprises ordering the first node and the second node based on the first tag and the second tag.

* * * * *